US009007048B2

(12) United States Patent
Chen et al.

(10) Patent No.: US 9,007,048 B2
(45) Date of Patent: Apr. 14, 2015

(54) MULTI-PHASE POWER SUPPLY CONTROLLER AND METHOD THEREFOR

(71) Applicants: Gang Chen, Taipo (HK); Gabor Reizik, Dublin, CA (US); Paul J. Harriman, Belfair, WA (US); Kisun Lee, Hwasungsi (KR)

(72) Inventors: Gang Chen, Taipo (HK); Gabor Reizik, Dublin, CA (US); Paul J. Harriman, Belfair, WA (US); Kisun Lee, Hwasungsi (KR)

(73) Assignee: Semiconductor Components Industries, LLC, Phoenix, AZ (US)

( * ) Notice: Subject to any disclaimer, the term of this patent is extended or adjusted under 35 U.S.C. 154(b) by 148 days.

(21) Appl. No.: 13/958,429

(22) Filed: Aug. 2, 2013

(65) Prior Publication Data

US 2014/0049240 A1 Feb. 20, 2014

Related U.S. Application Data

(60) Provisional application No. 61/684,686, filed on Aug. 17, 2012.

(51) Int. Cl.

| | |
|---|---|
| ***G05F 1/10*** | (2006.01) |
| ***H02M 3/156*** | (2006.01) |
| *H02M 3/158* | (2006.01) |

(52) U.S. Cl.
CPC ................ *G05F 1/10* (2013.01); *H02M 3/158* (2013.01); *H02M 3/156* (2013.01)

(58) Field of Classification Search
USPC .................................................. 323/282–290
See application file for complete search history.

(56) References Cited

U.S. PATENT DOCUMENTS

| | | | | |
|---|---|---|---|---|
| 5,481,178 | A * | 1/1996 | Wilcox et al. | 323/287 |
| 7,071,660 | B2 * | 7/2006 | Xu et al. | 323/266 |
| 7,595,617 | B2 | 9/2009 | Schiff | |
| 8,148,966 | B2 | 4/2012 | Chen et al. | |
| 8,754,624 | B2 * | 6/2014 | Sato | 323/285 |
| 2009/0289612 | A1 * | 11/2009 | Hojo et al. | 323/290 |

* cited by examiner

*Primary Examiner* — Jessica Han
(74) *Attorney, Agent, or Firm* — Robert F. Hightower

(57) ABSTRACT

In one embodiment, a method of forming a multi-channel power supply controller includes forming a plurality of channels configured to regulate an output voltage between first and second values, configuring the controller to select a channel that has a lowest current value and initiate forming a drive signal for that channel responsively to the output voltage having a value that is less than the first value, configuring a reset circuit for each channel to terminate the respective drive signal responsively to at least the output voltage having a value greater than the first value.

20 Claims, 5 Drawing Sheets

MULTI-PHASE POWER SUPPLY CONTROLLER AND METHOD THEREFOR

PRIORITY CLAIM TO PRIOR PROVISIONAL FILING

This application claims priority to prior filed Provisional Application No. 61/684,686 entitled "MULTIPHASE CONVERTER AND METHOD" filed on Aug. 17, 2012, and having common inventors Harriman et al.

BACKGROUND OF THE INVENTION

The present invention relates, in general, to electronics, and more particularly, to semiconductors, structures thereof, and methods of forming semiconductor devices.

In the past, various methods and structures were used to form switching power supply controllers, such as pulse width modulated (PWM) or pulse frequency modulation (PFM) controllers. The switching power supply controllers typically attempted to regulate an output voltage, to a desired value. Fixed frequency controllers, such as PWM controllers, often did not respond quickly to load transients. For example, some PWM controllers did not provide a consistent response to a rapid step change in the load. These PWM controllers often had beat frequencies which resulted in noise in the output voltage.

Accordingly, it is desirable to have a power supply controller that more accurately regulates the value of the output voltage, that provides an improved response to a step change in the load, and that minimizes impact of beat frequencies on the output voltage. It also may be desirable to have a power supply controller that forms multiple phases.

Figure 1:
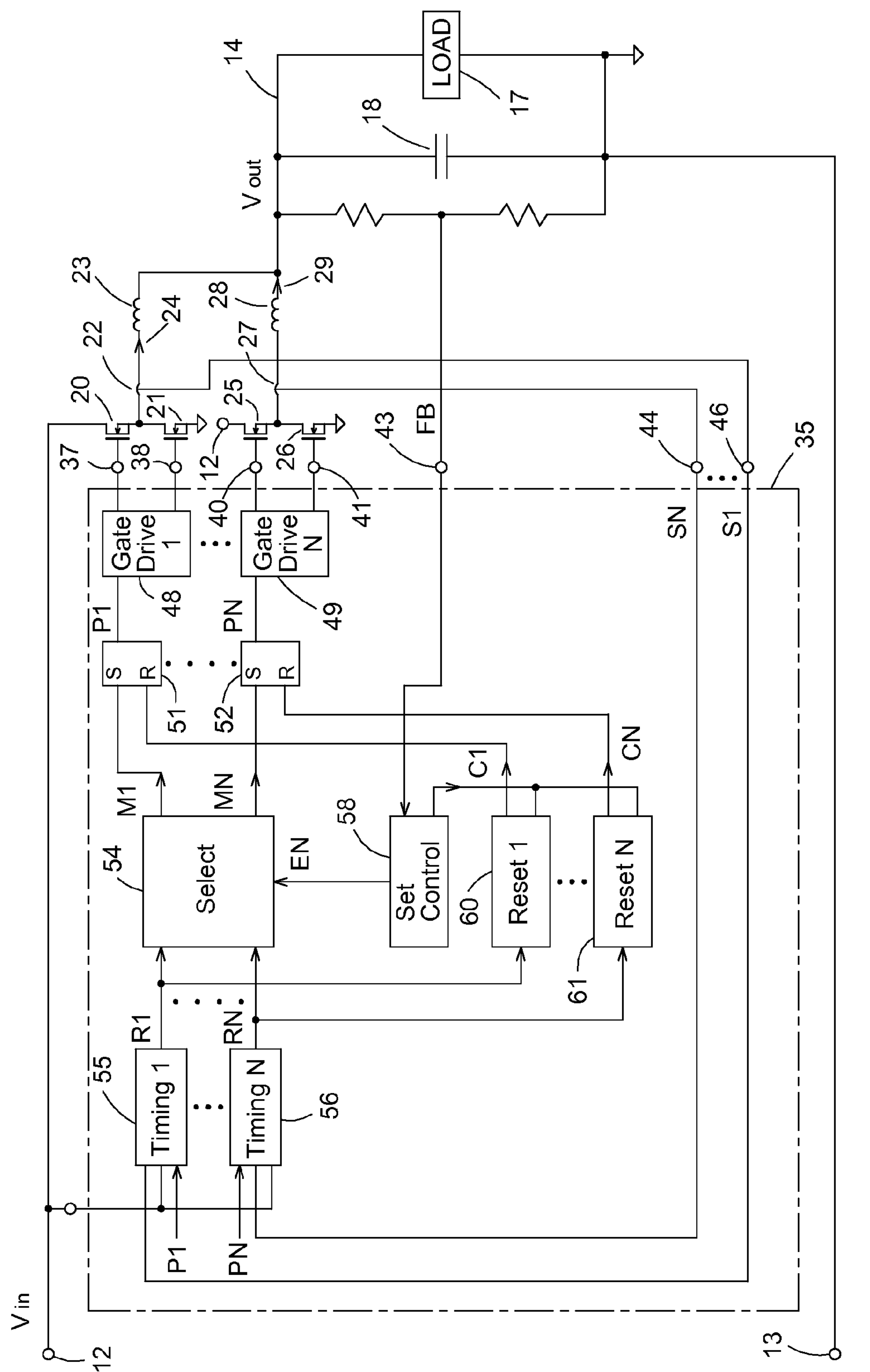
FIG. 1 schematically illustrates an example of an embodiment of a portion of a multi-phase power supply system that includes a multi-phase power supply controller in accordance with the present invention.

For simplicity and clarity of the illustration (s) elements in the figures are not necessarily to scale, some of the elements may be exaggerated for illustrative purposes, and the same reference numbers in different figures denote the same elements, unless stated otherwise. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, or certain N-type or P-type doped regions, a person of ordinary skill in the art will appreciate that complementary devices are also possible in accordance with the present invention. One of ordinary skill in the art understands that the conductivity type refers to the mechanism through which conduction occurs such as through conduction of holes or electrons, therefore, and that conductivity type does not refer to the doping concentration but the doping type, such as P-type or N-type. It will be appreciated by those skilled in the art that the words during, while, and when as used herein relating to circuit operation are not exact terms that mean an action takes place instantly upon an initiating action but that there may be some small but reasonable delay(s), such as various propagation delays, between the reaction that is initiated by the initial action. Additionally, the term while means that a certain action occurs at least within some portion of a duration of the initiating action. The use of the word approximately or substantially means that a value of an element has a parameter that is expected to be close to a stated value or position. However, as is well known in the art there are always minor variances that prevent the values or positions from being exactly as stated. It is well established in the art that variances of up to at least ten percent (10%) (and up to twenty percent (20%) for semiconductor doping concentrations) are reasonable variances from the ideal goal of exactly as described. When used in reference to a state of a signal, the term. "asserted" means an active state of the signal and the term "negated" means an inactive state of the signal. The actual voltage value or logic state (such as a "1" or a "0") of the signal depends on whether positive or negative logic is used. Thus, asserted can be either a high voltage or a high logic or a low voltage or low logic depending on whether positive or negative logic is used and negated may be either a low voltage or low state or a high voltage or high logic depending on whether positive or negative logic is used. Herein, a positive logic convention is used, but those skilled in the art understand that a negative logic convention could also be used. The terms first, second, third and the like in the claims or/and in the Detailed Description of the Drawings, as used in a portion of a name of an element are used for distinguishing between similar elements and not necessarily for describing a sequence, either temporally, spatially, in ranking or in any other manner. It is to be understood that the terms so used are interchangeable under appropriate circumstances and that the embodiments described herein are capable of operation in other sequences than described or illustrated herein.

DETAILED DESCRIPTION OF THE DRAWINGS

FIG. 1 schematically illustrates an example of an embodiment of a portion of a multi-phase power supply system 10 that includes a multi-phase power supply controller 35. System 10 is illustrated for simplicity of the descriptions as a multi-phase buck controller but it may be a multi-phase transformer isolated controller in other embodiments. System 10 receives an input voltage Vin between a voltage input 12 and a common return 13, and forms an output voltage (Vout)

between an output 14 and return 13. Controller 35 is configured to regulate the value of the output voltage (Vout) to a desired value within a range of values around the target value. For a non-limiting example, the desired value may be three volts (3 v) and the range of values may be plus or minus ten percent (10%) around the three volts.

System 10 includes a plurality of phases or channels that are illustrated in a general manner with numbers such as channel 1 through channel N. A first channel or channel 1 includes a pair of switches, such as transistors 37 and 38, configured in a synchronous rectifier configuration to provide an output current 24 of channel 1 to an inductor 23 of channel 1. A sense circuit 22 of channel 1 is configured to form a sense signal S1 of channel 1 that is representative of the instantaneous value of current 24. Each channel of the plurality of channels is similarly configured in including she Nth channel which includes a pair of switches, such as transistors 25 and 26, configured in a synchronous rectifier configuration to provide an Nth output current 29 to an inductor 28 of channel N. A sense circuit 27 of channel N is configured so form a sense signal SN of channel N that is representative of the instantaneous value of current 29. System 10 typically combines each output current of each phase or channel to provide a load current to a load 17 and to form the output voltage. An output capacitor 18 may be connected from output 14 to return 13 to assist in forming the output voltage. A feedback circuit of system 10 is configured to form a feedback signal (FB) that is representative of the value of the output voltage. The feedback circuit is illustrated as a resistor divider for simplicity of the description but may be other circuits in other embodiments. For a non-limiting example, the feedback circuit may include an optical coupler configured to form the feedback signal.

As will be seen further hereinafter controller 35 includes a plurality of channels or phases, such as channels 1 through N, wherein each channel is configured to form a corresponding drive signal, such as respective drive signals P1 through PN, for the corresponding channel. Each drive signal is formed to control the corresponding output current, such as respective currents 24 and 29, of the corresponding channel through the inductor of the corresponding channel, such as respective inductors 23 or 28, to regulate the value of the output voltage to the desired value. In an embodiment, controller 35 may be configured to regulate the value of the output voltage between a first threshold value and a second threshold value. An embodiment includes forming the first and second threshold values to be values around the desired value. An embodiment may include that one of the first or second threshold values is less than the desired value and the other of the first or second threshold values is greater than the desired value. Those skilled in the art will appreciate that any number of drive signals P1 thought PN may be in an asserted or negated state at any one time and that any of timing signals R1 through RN may be in an asserted or negated state at any one time. As will be seen further hereinafter, controller 35 does not operate at a fixed frequency and does not form the drive signals at a fixed frequency. In an embodiment, controller 35 does not have either of a fixed ON-time or fixed OFF-time circuit and does not form the drive signals with either of a fixed ON-time or fixed OFF-time.

An embodiment may include forming controller 35 to include a select circuit 54 that is configured to select a first channel, such as one of channel 1 through channel N, of the plurality of channels. Controller 35 may also be formed to include a set control circuit or set circuit 58 that is configured to cause the first channel to form the first drive signal, for example the first channel being the selected channel one of the first through Nth channels, of the first channel responsively to the output voltage being less than the first threshold value. In an embodiment, the first threshold value may be less than the desired value. Controller 35 may also be configured to include a reset circuit for each channel, such as circuit 60 for channel 1 and circuit 61 for channel N, of the plurality of channels wherein each reset circuit forms a reset signal, such as signal C1 for channel 1 and signal CN for channel N, to reset the drive signal of the corresponding channel, such as respective drive signals P1 and PN, responsively to the output voltage being no less than a second threshold value.

In an alternative embodiment, select circuit 54 may not receive R1 through RN and circuit 54 may just switch the EN signal from the set control circuit 58 to one of channel M1 through MN in a sequentially.

An embodiment includes forming each reset circuit to modulate the second threshold voltage of the corresponding reset circuit responsively to the output current for the corresponding channel. In one non-limiting example, circuit 60 may decrease (alternately increase) the second threshold value from a third value to a fourth value as the output current increases (alternately decreases).

Another embodiment may include forming each reset circuit to reset the drive signal responsively to a difference between a value of the output current of the corresponding channel, such as current 29 for channel N, and the value of the output voltage.

Another embodiment of controller 35 may include forming a timing circuit for each channel, such as a timing circuit 55 for channel 1 and a timing circuit 56 for channel N, including configuring the timing circuit, for example circuit 55 or circuit 56, to form a timing signal, such as corresponding signals R1 and RN, having a value that is representative of the output current of the corresponding channel wherein the timing circuit initiates forming the timing signal responsively to the drive signal for the corresponding channel, such as responsively to signal P1 for channel 1. An embodiment may include that the value of a timing signal is proportional to the value of the current of the corresponding channel. An embodiment may include the timing signal being representative of the corresponding current when the drive signal for that channel is negated.

An embodiment may include forming each reset circuit, for example each of circuit 60 and 61, to for a signal that is representative of the second threshold value and to modulate the second threshold of each reset circuit, such as a second threshold value of circuit 60 and a second threshold value of circuit 61, responsively to the output current of the corresponding channel, such as current 24 for circuit 60 and current 29 for circuit 61.

An embodiment may include forming the reset circuit to cause resetting of the drive signal responsively to a difference between the timing signal and a value of the output voltage, such as the value represented by the error signal as a non-limiting example.

Another embodiment of controller 35 may include configuring set circuit 58 to form an error signal that is representative of a difference between the output voltage and the desired value of the output voltage and configuring set circuit 58 to enable, such as enable signal EN for example, the first channel, such as channel 1 or N for example, as selected by select circuit 54, for a non-limiting example as shown by an asserted one of M1 through MN, to form the first drive signal, such as signal PN for example.

Yet another embodiment may include configuring controller 35 to form a plurality of drive signals, such as signals P1-PN for example, to control the plurality of output currents, such as corresponding currents 24 through 29 for example, through a plurality of inductors such as corresponding inductors 23 through 28 for example, to regulate the value of the output voltage to a value between a first threshold value and a second threshold value.

An embodiment may also include forming select circuit 54 to select a first channel, such as one of the first through Nth channels, of the plurality of channels that has a lowest value of output current. The embodiment may also include configuring set circuit 58 to initiate the first channel, such as the first channel selected by select circuit 54, forming a first drive signal, such as the drive signal corresponding to the selected first channel, of the plurality of drive signals responsively to the output voltage having a value that is less than the first threshold value.

An embodiment may also include forming a reset circuit, such as one of circuits 60 or 61, for each drive signal, for example respective drive signals P1 and PN, wherein each reset circuit is configured to reset a corresponding drive signal, such as signal P1 for circuit 60 and PN for circuit 61, responsively to the output voltage having a second value that is no less than a second threshold value and responsively to the corresponding drive signal. Another embodiment may include forming the second threshold value greater than the first threshold value and greater than a desired value of the output voltage.

Another embodiment may include forming a timing circuit for each channel, such as circuit 55 for channel 1 and circuit 56 for channel N, wherein each timing circuit is configured to form a timing signal, such as one of signals R1 or RN, that is representative of the value of the output current of the corresponding channel, such as respective currents 24 and 29.

Another embodiment may include forming at least one timing circuit to form a value of the timing signal during an off-time of the corresponding drive signal, such as the negated state of respective signals P1 and PN, to be representative of an average value of the output current for the corresponding channel, such as respective currents 24 and 29.

Another embodiment may include configuring the select circuit and the reset circuit of a channel, for example one of circuits 60 or 61, to form a duty ratio of the drive signal of the channel, such as one of respective signals P1 or PN, to be proportional to the output current, such as the respective one of currents 24 or 29, of the channel. An embodiment may include that the duty ratio of the drive signal of the channel, such as one of respective signals P1 or PN, is inversely proportional to the output current, such as the respective one of currents 24 or 29, of the channel.

Another embodiment may include configuring an error amplifier to form an error signal, such as signal ES for example, that is representative of a difference between the output voltage and a desired value of the output voltage and initiate forming a drive signal of a channel selected by the select circuit responsively to the error signal having a value greater than a reference signal, such as the REF signal as a non-limiting example, that is representative of a first threshold value.

Figure 2:
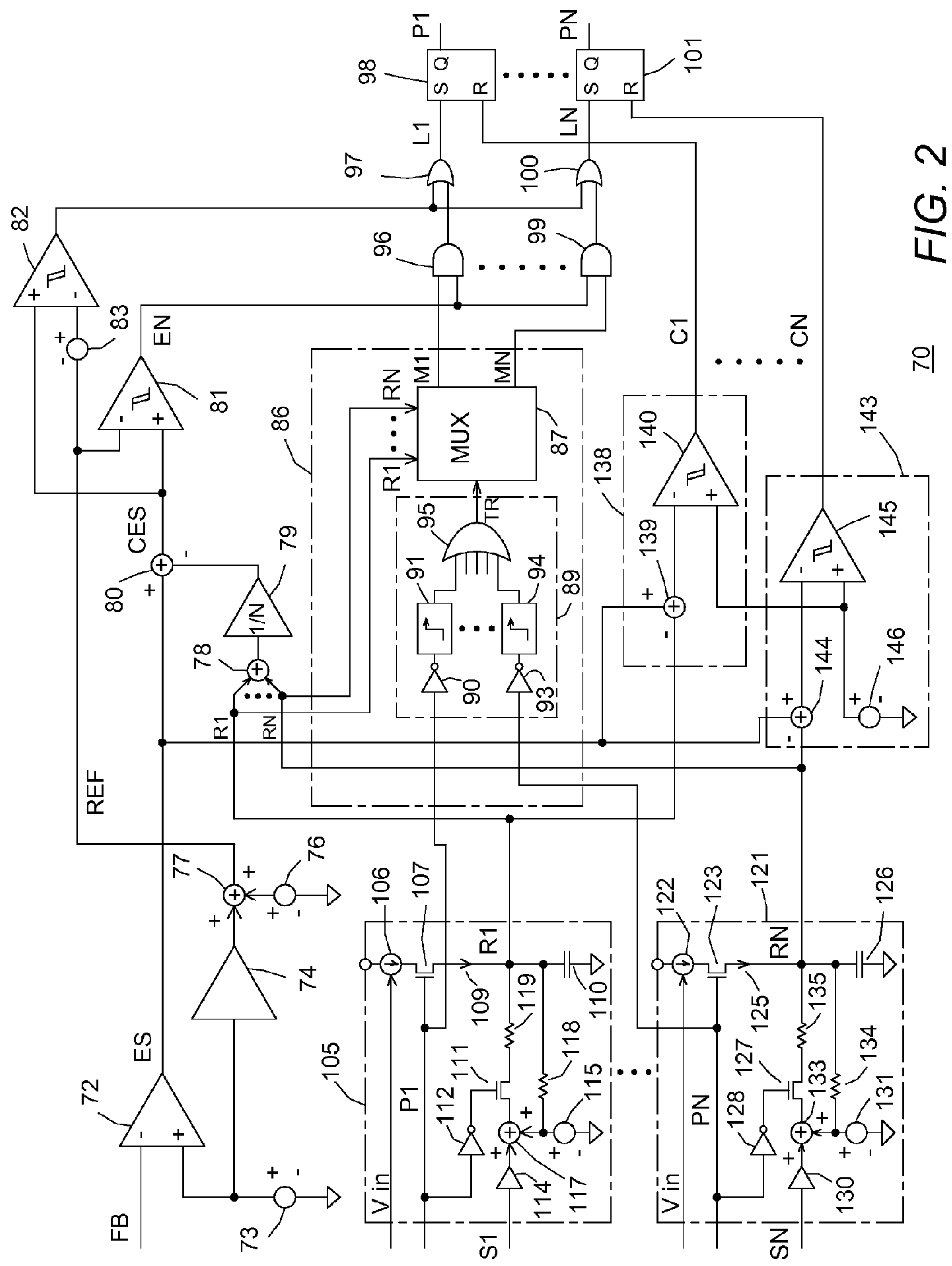
FIG. 2 schematically illustrates an example of an embodiment of a portion of a multi-phase power supply controller that is an alternate embodiment of the controller of FIG. 1 in accordance with the present invention.

FIG. 2 schematically illustrates an example of an embodiment of a portion of a multi-phase power supply controller 70 that is an alternate embodiment of controller 35 that was described in the description of FIG. 1. Controller 70 is formed with a plurality of phases or channels similarly to controller 35. Controller 70 includes a select circuit 86 that is an example of an alternate embodiment of circuit 54 that was described in the description of FIG. 1. Controller 70 also includes a plurality of timing circuits including a timing circuit 105 that is a portion of a first channel of controller 70 and a timing circuit 121 that is a portion of an Nth channel of controller 70. Circuits 105 and 121 are alternate embodiments of respective circuits 55 and 56 (FIG. 1). Controller 70 also includes a plurality of reset circuits such as a reset circuit 138 that is a portion of the first channel of controller 70 and an reset circuit 143 that is a portion of the Nth channel of controller 70. Circuits 138 and 143 are alternate embodiments of respective circuits 60 and 61 (FIG. 1). The first channel of controller 70 may also include a drive latch 98 that latches the first drive signal P1 while the Nth channel may also include a drive latch 101 that latches the Nth drive signal PN.

An embodiment of the sec control circuit or set circuit of controller 70 may include an error amplifier 72, a reference circuit 73, an error comparator 81, a reference generating circuit configured to form a reference signal REF, and an initiate circuit. The set circuit is an example of an alternate embodiment of circuit 58 described in the description of FIG. 1. An example embodiment of the initiate circuit may include AND gates 96 and 99. Gate 96 may be a portion of the first channel of controller 70 and gate 99 may be a portion of the Nth channel.

Circuit 86 is formed to select one channel of the plurality of channels. In one embodiment, circuit 86 is formed to determine which of channels 1 through N has the lowest value of current, such as the lowest current of output currents 24 through 29 (FIG. 1), that is applied to the corresponding inductor of that channel, and to select that corresponding channel having the lowest value of output current. For example, if current 29 is lower than current 24, circuit 86 selects the Nth channel.

Timing circuits 105 and 121 are each configured to form a ramp signal, such as respective signals R1 and RN, for the channel that corresponds to the timing circuit. For example, circuit 105 is configured to form ramp signal R1 for the first channel and timing circuit 121 is configured to form ramp signal RN for the Nth channel. Circuit 105 includes a current source 106, a capacitor 110, and a charging transistor 107. Circuit 105 is configured to initiate forming ramp R1 responsively to drive signal P1. In another embodiment, circuit 105 is configured to initiate forming ramp R1 responsively to the output voltage having a value that is less than the first threshold value since drive signal P1 is also initiated responsively to the output voltage being less than the first threshold value. Asserting ramp R1 enables transistor 107 thereby allowing current 109 from current source 106 to begin charging capacitor 110. In one embodiment, current source 106 is a variable current source such that the value of charging current 109 is proportional to the value of the input voltage Vin. Varying the value of current 109 based on the input voltage feeds variations of the input voltage forward and adds it into the value of the ramp signal to assist controller 70 in quickly responding to the variations of the input voltage. The feed forward of the input voltage also facilitates minimizing frequency variations in the drive signal that may otherwise result from changes in the input voltage. In response to negating signal P1, circuit 105 adjusts the value of the voltage on capacitor 110 in response to the value of the current supplied by the first channel. In one embodiment, negating drive signal P1 enables transistor 117 which couples the signal from amplifier 114 that is representative of the value of current 24 to capacitor 110. In an embodiment, circuit 105 receives current sense signal S1 through a buffer amplifier 114. The output of amplifier 114 is added to an offset voltage from a voltage reference 115. In one embodiment, the offset voltage from reference 115 increases the minimum voltage of signal R1 to be no less than the minimum voltage of an error signal (ES), to be explained hereinafter. This relationship assists in reducing limitation on the minimum duty cycle or duty ratio of the drive signal of the corresponding channel, such as signal P1 for circuit 105. Transistor 111 couples the adjusted current signal to capacitor 110 so capacitor 110 is held at a voltage that is representative of the average value of current 24 responsively to a negated state of the first drive signal. An optional resistor 119 may be coupled between transistor 111 and capacitor 110 to function as a filter that limits the rate at which the adjusted current signal can change the voltage stored on capacitor 110. The time constant of the filter typically is less than a switching period of drive signal P1. Another optional resistor 118 may be connected between capacitor 110 and reference 115 to assist in having a voltage on capacitor 110 during cycle skipping operations.

Circuit 121 is similar to circuit 105 except that circuit 121 forms the ramp signal RN for the Nth phase. Circuit 121 includes a current source 122, a charging transistor 123, and a capacitor 126 that function similarly to respective sources 106, transistor 107, and capacitor 110 such that source 122 supplies a charging current 125 to charge capacitor 126 responsively to the output voltage having a value that is less than the first threshold value such as responsively to the negated state of drive signal PN.

The set circuit of controller 70 is configured to initiate forming the drive signal for the channel or phase that was selected or enabled by select circuit 86 so that the selected channel may form the respective drive signal. The set circuit is configured to initiate forming the drive signal of the selected channel responsively to the output voltage having a value that is less than the first threshold value of the output voltage. Error amplifier 72 monitors the output voltage and forms an error signal (ES) that is representative of the deviation of the output voltage from she desired threshold value of the output voltage. Amplifier 72 receives the feedback signal that is representative of the output voltage and a reference signal from reference circuit 73 and forms the error signal ES. For such an embodiment, the signal from reference 73 may be representative of the desired value of the output voltage. As will be seen further hereinafter, the set circuit may have other embodiments.

The set control circuit may also form a reference signal (REF) that is used to determine if the output voltage is less than the first threshold value. In one embodiment, the reference signal (REF) may be representative of the first threshold value. A buffer 74 forms a signal that is representative of the reference signal from reference 73. An adder adds an offset signal from an offset circuit 76 to the reference signal from circuit 73 to form reference signal REF. In one embodiment, the value of the reference signal REF may be representative of the first threshold value of the output voltage.

An embodiment of the set circuit may also include an optional current averaging circuit that forms an average signal that is representative of the average value of the sum of all the output currents formed by all the phases. One example embodiment of a current averaging circuit illustrated in FIG. 2 may include a summing circuit 78 that sums together the value of each of the ramp signals from each channel, and an averaging circuit 79 that forms an average value of the output currents, for example dividing the sum of the currents from circuit 78 by the number N of channels. Because the ramp signal is related to the average value of the corresponding output current, summing circuit 78 sums the value of the currents. An optional subtract circuit 80 may be used to subtract the signal representing the average value of all the output currents from the error signal (ES) and form a compensated error signal CES. As can be seen, as the value of the output currents change, the value of CES is changed in an opposite direction. Thus, if the output current of a channel increases (alternately decreases), ES is decreased (alternately increased) to form the value of CES. In an embodiment, such results in decreasing (alternately increasing) the value of output current in that channel as a result of the increase (alternately decrease). Compensating the error signal with the average value of the output currents assists in providing improved current balancing between the phases and forming the drive signals to have more equalized ON-times. Compensating the error signal also assists in minimizing jitter on the drive signals. In another embodiment, the individual ramp signals may be used instead of the average value from circuit 79.

In one embodiment, select circuit 86 determines which of the channels is supplying the lowest value of current and selects that phase to initiate the next drive signal. In an embodiment, circuit 86 may also include a trigger circuit 89 that forms a trigger signal (TR) that assists in operating MUX 87. One embodiment of circuit 89 receives each of the drive signals P1-PN and initiates the trigger signal (TR) in response to a transition of any one of the drive signals. One example embodiment of circuit 89 utilizes an edge detector to generate a short pulse in response to the drive signal for that channel being terminated. For example, in response to P1 being negated an inverter 90 provides a positive signal to an edge detector 91 which generates a pulse through an OR gate 95 to form the TR signal. Another inverter 93 receives the Nth drive signal and forms a pulse from an edge detector 94 in response to the Nth drive signal being negated. Those skilled in the art twill appreciate that inverters 90 and 93, detectors 91 and 94, and OR gate 95 are just one example of a circuit that can form a pulse in response to a transition on one or more inputs of a plurality of inputs. For example detectors 91 and 94 may also be one-shots or D-type flip-flops or other embodiments may be used to form circuit 89.

An embodiment of multiplexer (MUX) 87 of circuit 86 is configured to determine which channels 1 through N has lowest value of output current and select that channel, or example select that channel to form the next drive signal. In one embodiment, MUX 87 receives each ramp signal from the plurality of channels and uses these signals to determine which channel has the lowest value of output current. In response to receiving the TR signal, MUX 87 determines which of ramp signals R1 through RN has the lowest value and asserts one multiplexer output M1 through MN that corresponds to the channel with the lowest value ramp signal, thus, the channel with the lowest value of output current. Other embodiments of circuit 86 or MUX 87 may function differently to select one channel as will be seen further hereinafter. In another embodiment, MUX 87 may receive the current sense signals S1 through SN instead of the ramp signals R1 through RN and use the value of the current sense signal to determine the channel having the lowest value of output current.

In operation, if the value of the output voltage decreases to less than the first threshold value, the feedback (FR) signal to amplifier 72 decreases to a value that is less than the value of voltage for circuit 73 which increases the value of the error signal (ES). The averaging circuit that includes subtract circuit 80 subtracts the average value of all the output currents from the error signal (ES) to form compensated error signal CES.

The increases in the compensated error signal (CES) causes CES so increase above the value of the reference signal REF thereby asserting she enable signal (EN) on the output of comparator 81. The asserted enable (EN) signal enables gates 96 through 99 to transmit the signal from circuit 86 chat represents the selected channel, thereby initiating forming the drive signal of the channel corresponding the channel selected by circuit 86. In an embodiment, she output of the selected one of gates 96 or 99 is forced high to set the corresponding latch of the selected channel and initiate forming the corresponding drive signal. For example if select circuit 86 had selected channel 1, MUX 87 output M1 would be asserted which would cause the output of gate 96 to be asserted through gate 97 and set latch 98 thereby initiating the assertion of drive signal P1.

The drive signal remains asserted until terminated by the corresponding one of circuits 138 or 143. For example, if any one of drive signals P1 through PN is asserted, it remains asserted until terminated by the corresponding one of circuits 138 through 143. The drive signal remains asserted until the value of the output voltage increases to no less than the second threshold value which decreases the value of error signal ES. The decreased value of error signal ES is received by reset circuits 138 and 143. Those skilled in the art will appreciate that the polarities of the error signal (ES) may be reversed in some embodiments. Reset circuits 138 through 143 are configured to receive the error signal and form a reset signal for the corresponding channel, such as respective reset signals C1 through CN, responsively to the output voltage having a value that is no less than the second threshold value. In one embodiment, circuits 138 and 143 are configured to modulate the value of error signal by the output current of the corresponding channel and form an Off error signal for the corresponding reset circuit such as an Off error signal 1 (OE1) for the $1^{st}$ channel through an Off error signal N (OEN) for the Nth channel. In an embodiment, the ramp signal for the corresponding channel is subtracted from the ES signal to form the Off error signal for the corresponding channel. Subtracting the ramp signal from the error signal compensates the ON-time of the duty cycle by the value of the output current of that phase or channel to provide improved dynamic current balancing between the phases or channels. If the output current of that channel is increased (alternately decreased), ES is decreased (alternately increased) in the resulting OE signal and the drive signal is terminated sooner (alternately later) than with just the error signal. This assists in balancing the output currents of all the phases. If the output voltage is no less than the second threshold value Off error signal on the output of the corresponding summing circuit 139 or 144 (and corresponding signals OE1 or OEN) becomes greater than a reference circuit 146 which asserts the output of the corresponding one of comparators 140 or 145 and asserts the corresponding one of signals reset C1 or CN. The asserted signal C1 or CN clears the corresponding latch 98 or 101 thereby terminating the corresponding drive signal P1 or PN.

The set circuit may optionally include a transient circuit configured to initiate forming one or more of the plurality of drive signal responsively to an output voltage value no greater than a lower threshold value. A non-limiting example embodiment may include a detect comparator 82 and transient control gates 97 and 100 that may be a portion of the respective first and Nth channels. If there is a load transient that causes the output voltage to decrease to less than the lower threshold value, comparator 82 is triggered to enable one or more or all of the drive signals in an effort to increase the value of the output voltage. If the output voltage increase above this lower threshold, comparator 82 disables the control signal and operation of the drive signals may be returned to select circuit 86 and the set circuit. In an embodiment, the lower threshold value is less than the desired value and is less than either of the first or second threshold value.

Those skilled in the art will appreciate that the foregoing described features of controller 70 may be facilitated by amplifier 72 having a non-inverting input connected to receive the feedback signal and an inverting input connected to an output terminal of reference 73. An output of amplifier 72 is commonly connected to a first input of circuit 138, a first input of circuit 143, and deposited input of circuit 80. In input of amplifier 74 is connected to the first terminal of reference 73 and an output of amplifier 74 is connected to a first input of circuit 77. An output of reference 76 is connected to a second input of circuit 77 which has an output commonly connected to an inverting input of comparator 81 and a new first terminal of reference 83. A second terminal of reference 83 is connected to an inverting input of comparator 82. A non-inverting input of comparator 82 is commonly connected to a non-inverting input of comparator 81 and an output of circuit 80. An output of comparator 81 is connected to a first input of gate 96 and a first input of gate 99. An output of comparator 82 is connected to a first input of gate 97 and a first input of gate 100. Circuit 105 includes a first terminal of source 106 connected to receive an operating supply voltage and a second terminal connected to a drain of transistor 107. A control input of source 106 is connected to receive the input voltage Vin. A gate of transistor 107 is commonly connected to a first input of inverter 112 and a first input of inverter 90. A source of transistor 107 is commonly connected to a first terminal of capacitor 110, a first terminal of resistor 119, to a first terminal of resistor 118, and to a second input of circuit 138, to a first input of MUX 87, and so a first input of circuit 78. A second terminal of capacitor 110 is connected to return 13. A second terminal of resistor 119 is connected to a drain of transistor 111 which has a source connected to an output of circuit 117. A gate of transistor 111 is connected to an output of inverter 112. A first input of circuit 117 is connected to receive the current sense signal through an output of buffer 114 which has an input connected to receive current sense signal S1. A second input of circuit 117 is connected to a second terminal of resistor 118 and to an output of reference 115 which has an input connected to return 13. Circuit 121 includes current source 122 having a first input connected to receive the operating voltage, a control input connected to receive the input voltage Vin, and an output connected to a drain of transistor 123. A gate of transistor 123 is commonly connected to receive the drive signal PN, a first input of inverter 128, and an input of inverter 93. A source of transistor 123 is commonly connected to a second input of circuit 144, a second input of circuit 78, a second input of MUX 87, a first terminal of resistor 135, a first terminal of resistor 134, and a first terminal of capacitor 126. Capacitor 126 has a second terminal connected to return 13. A second terminal of resistor 134 is commonly connected to an input of circuit 133 and an output of circuit 131 which has an input connected to return 13. An output of circuit 133 is connected to a source of transistor 127 which has a drain connected to a second terminal of resistor 135. A gate of transistor 127 is connected to an output of inverter 128. A second input of circuit 133 is connected to receive current sense signal is sent through an output of buffer 130 which has an input connected to receive signal SN. An output of circuit 144 is coupled to an inverting input of comparator 145. A non-inverting input of comparator 145 is commonly connected to a non-inverting input of comparator 140 and to an output of circuit 146 which has an input connected to return 13. An inverting input of comparator 140 is connected to an output of circuit 139. An output of comparator 140 is connected to a reset input of latch 98. An output of comparator 145 is connected to a reset input of latch 101. A set input of latch 98 is connected to an output of gate 97 which has a second input connected to an output of gate 96. Gate 96 has a second input connected to receive signal M1 from circuit 86. A second input of gate 99 is connected to receive an output them in of circuit 86. An output of gate 99 is connected to a second input of gate 100 which has an output connected to a set input of latch 101. An output of circuit 78 is connected to an input of circuit 79 which has an output connected to the negative input of circuit 80. An output of inverter 90 is connected to an input of detector 91 which has an output connected to a first input of gate 95. An output of inverter 93 is connected to an input of detector 94 which has an output connected to a second input of gate 95. An output of gate 95 is connected to a trigger input of MUX 87.

Figure 3:
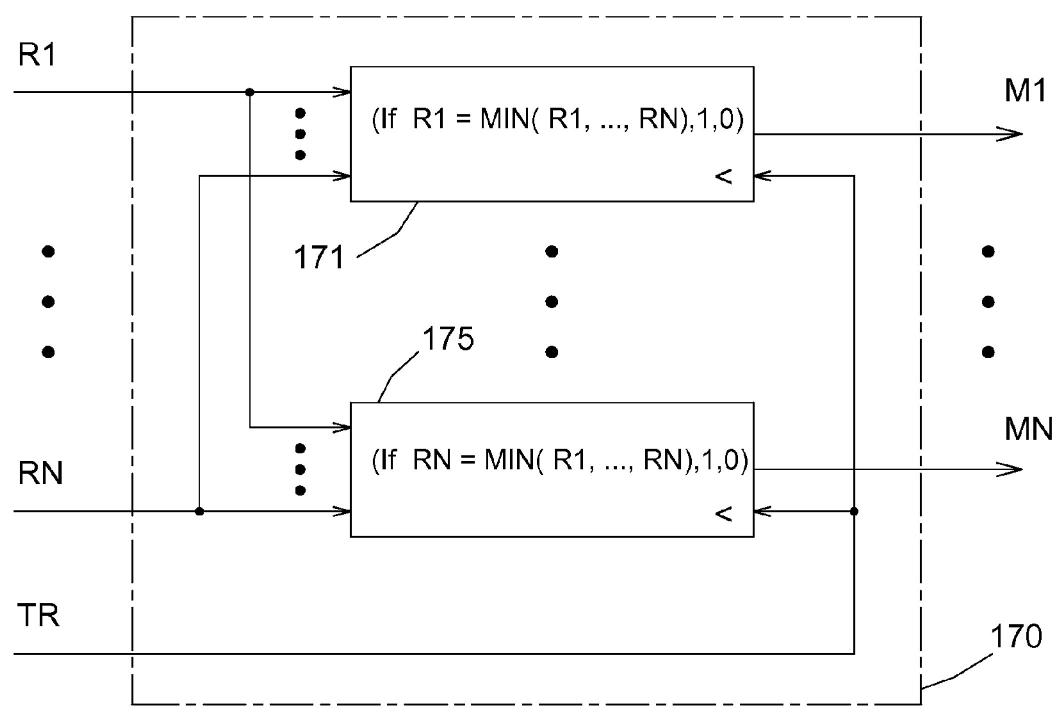
FIG. 3 schematically illustrates an example of an embodiment of a circuit that may be a portion of the controller of FIGS. 1 and/or FIG. 2 in accordance with the present invention.

FIG. 3 schematically illustrates an example of an embodiment of a multiplexer (MUX) 170 that is an example of an alternate embodiment of multiplexer 87 that was described in the description of FIG. 2. MUX 170 is configured to determine which channels 1 through N has lowest value of output current and select that channel, for example select that channel to form the next drive signal. In one embodiment, MUX 170 receives each ramp signal from the plurality of channels and uses these signals to determine which channel has the lowest value of output current. An embodiment of MUX 170 includes, in response to receiving the TR signal, MUX 170 determines which of ramp signals R1 through RN has the lowest value and asserts one multiplexer output M1 through MN that corresponds to the channel with the lowest value ramp signal, thus, the channel with the lowest value of output current.

MUX 170 includes a plurality of logic blocks or logic circuits 171 through 175 such chat Mux 170 has one logic block for each channel of controller 70. Block 171 is configured co determine if channel one (1) has the lowest value of current, and if so, assert output M1 in response to the trigger signal TR. In another embodiment, each logic block of MUX 170 is configured to determine if the channel corresponding the logic block has the lowest value of current, and if so, assert the corresponding output of MUX 170 in response to the trigger signal TR. An embodiment includes configuring MUX 170 to receive either all of the ramp signals R1 through RN or all of the sense signals S1 through SN.

Figure 4:
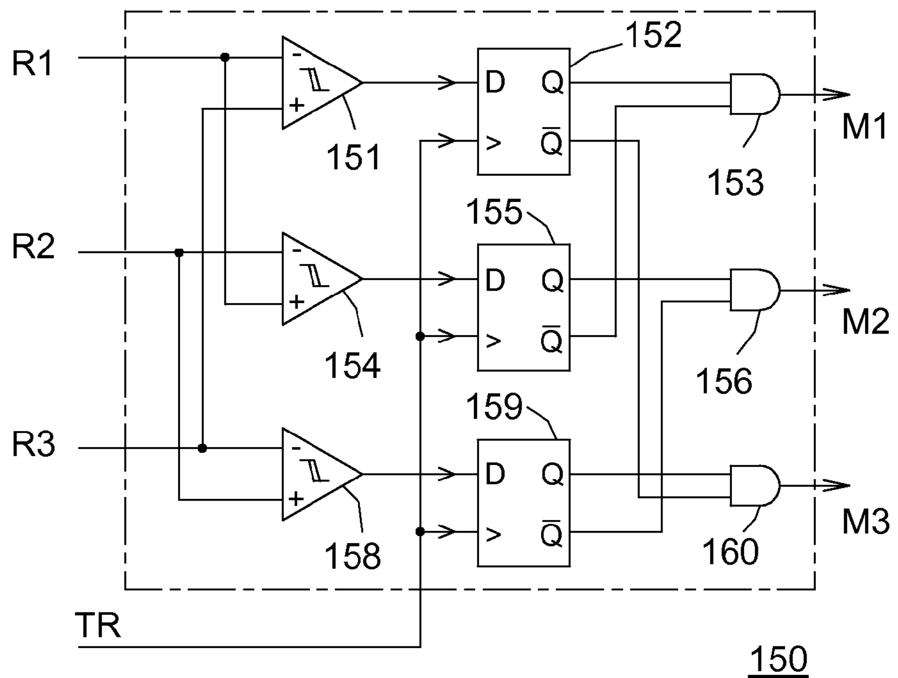
FIG. 4 schematically illustrates an example of an embodiment of a circuit that may be a portion of the controller of FIG. 1 and FIG. 2 in accordance with the present invention.

FIG. 4 schematically illustrates an example of an embodiment of a multiplexer (MUX) 150 that is an example of an alternate embodiment of multiplexer 87 that was described in the description of FIGS. 2 and/or 3. MUX 150 is configured for three-channels and includes a plurality of comparators including comparators 151, 154, and 158 that are configured to compare each timing signal, such as timing signals R1 to R3 to every other timing signal of the plurality of timing signals. Therefore, the number of comparators depends on the number of channels. For N number of channels, the number of comparators can be represented by the function N(N−1)/2. Each comparator has an associated storage element that is configured to store the result of the comparison responsively to the trigger (TR) signal. The output of comparator 151 is connected to a D input of a flip-flop 152 while an output of comparator 154 is connected to a D input of a flip-flop 155 and an output of comparator 158 is connected to a D input of flip-flop 159. Therefore the number of flip-flops is equal to the number of comparators. The function of gates 153, 156, and/or 160 is to select the channel with the lowest output current and then assert the output of the channel with the lowest current. Therefore, for an N phase case, the number of AND gates is N and each AND gate has N−1 number of input signals. In another embodiment, ramp signals R1 through RN may be replace by current sense signals S1 through SN. A Q output of flip-flop 152 is connected to an input of an AND gate 153 and a Qbar output of flip-flop 155 is connected to another input of gate 153. A Q output of flip-flop 155 is connected to a first input of an AND gate 156 and a Qbar output of flip-flop 159 is connected to a second input of gate 156. A Q output of flip-flop 159 is connected to a first input of an AND gate 160 and a second input of gate 160 is connected to a Qbar output of flip-flop 152.

Figure 5:
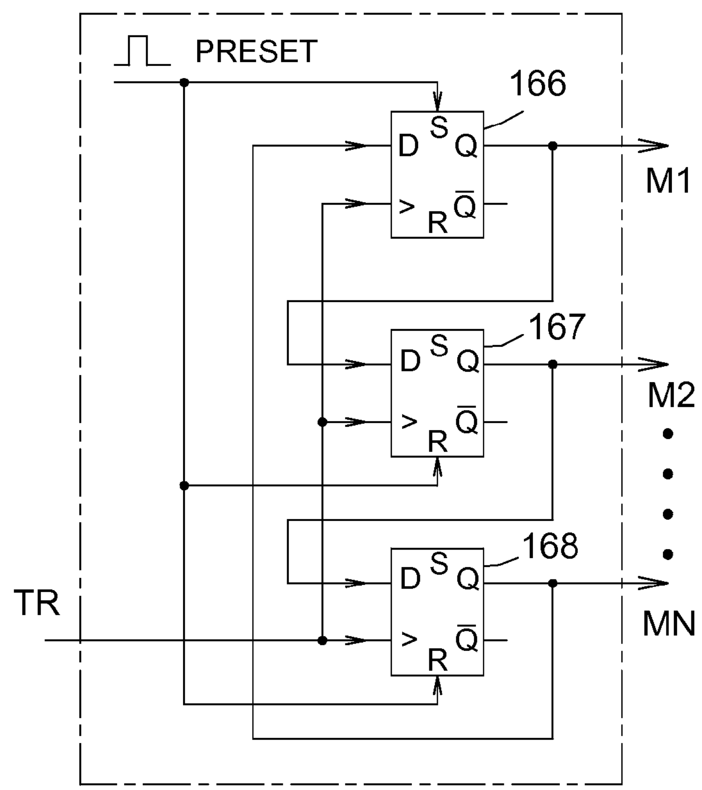
FIG. 5 schematically illustrates an example of an embodiment of a portion of a circuit that may be an alternate embodiment of the circuit of FIG. 3 in accordance with the present invention.

FIG. 5 schematically illustrates an example of an embodiment of a multiplexer (MUX) 165 that is an example of an alternate embodiment of multiplexers 87 and 150. MUX 165 is configured to sequentially select one of the channels 1 through N responsively to the CK signal. Thus MUX 165 functions similarly to a shift register that shifts a single logical '1' through the register.

Figure 6:
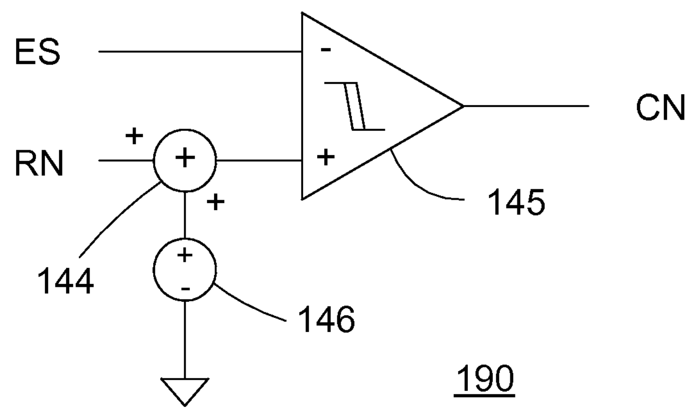
FIG. 6 schematically illustrates an example of an embodiment of a portion of a reset circuit that is an alternate embodiment of reset circuits of FIG. 2 in accordance with the present invention.

FIG. 6 schematically illustrates an example of an embodiment of a portion of a reset circuit 190 that is an alternate embodiment of any of reset circuits 138 through 143 that were described in the description of FIG. 2. An embodiment includes forming reset circuit 190 to modulate the second threshold value of a reset circuit responsively to the output current of the corresponding channel. Circuit 190 includes using the ramp signal from the corresponding channel to modulate a value of a reference signal from reference 146 by the value of the ramp from the corresponding timing circuit. For example for the 1$^{st}$ channel, circuit 190 receives ramp signal R1 and summing circuit 144 adds the value of R1 from the value of reference 146 to modulated the second threshold value.

Figure 7:
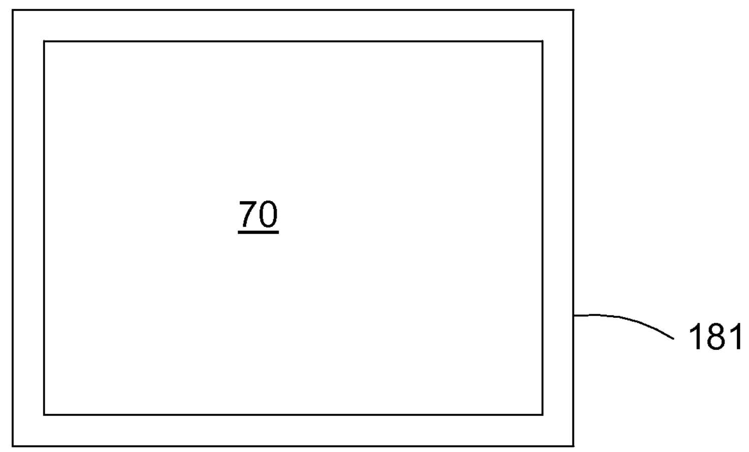
FIG. 7 illustrates an enlarged plan view of a semiconductor device that includes the power supply controller of FIGS. 1 and/or 2 in accordance with the present invention.

FIG. 7 illustrates an enlarged plan view of a portion of an embodiment of a semiconductor device or integrated circuit 180 that is formed on a semiconductor die 181. Controllers 35 and/or 70 may be formed on die 181. Die 181 may also include other circuits that are not shown in FIG. 7 for simplicity of the drawing. Controller 35/70 and device or integrated circuit 180 are formed on die 181 by semiconductor manufacturing techniques that are well known to those skilled in the art.

From all of the foregoing, one skilled in the at will appreciate that an embodiment of a multi-phase power supply controller may comprise:

a first channel configured to form a first drive signal, for example signal P1, to control a first output current through a first inductor, for example inductor L1, to control a value of an output voltage, such as voltage Vout for example, to a desired value; a second channel configured to form a second drive signal, for example signal P2, to control a second output current through a second inductor, for example inductor L2, to control the value of the output voltage to the desired value;

a first timing circuit, such as timing circuit 105 for example, of the first channel configured to form a first timing signal, such as corresponding signal R1, responsively to the first drive signal wherein the first timing signal is proportional to the first output current; a second timing circuit, such as timing circuit 121 for example, of the second channel configured to form a second timing signal, such as corresponding signal R2, responsively to the second drive signal wherein the second timing signal is proportional to the second output current;

a select circuit, such as circuit 86 for example, configured to determine one of the first or second output currents having a lowest value and select a corresponding channel; a set circuit configured to form an error signal representative of a deviation of the output voltage from a desired threshold value and to responsively initiate the one of the first or second channels selected by the select circuit to form the respective first or second drive signal;

a first reset circuit, such as circuit 138 for example, configured to terminate the first drive signal responsively to the first timing signal and to the output voltage being no less than the desired threshold value; and a second reset circuit, such as circuit 143 for example, configured to terminate the second drive signal responsively to the second timing signal and to the output voltage being no less than the desired threshold value.

Another embodiment may include, the first timing circuit configured to for a first ramp signal that is proportional to the first output current and to an input voltage and the second timing circuit is configured to form a second ramp signal that is proportional to the second output current and to the input voltage and wherein the output voltage is derived from the input voltage.

An embodiment may include the select circuit configured to receive the first and second timing signals and to select the corresponding channel responsively to the first or second reset circuits terminating either of the first or second drive signals.

In another embodiment, an error amplifier may be configured to form the error signal and an averaging circuit may be configured to compensate the error signal by the average value of the first and second output currents combined.

An embodiment may include a transient circuit configured to initiate forming one or more of the first and second drive signals responsively to the output voltage decreasing to a low threshold value that is less than the desired threshold value.

Another embodiment may include, a compare circuit configured to compare the first and second timing signals to determine the lowest value.

In view of all of the above, it is evident that a novel device and method is disclosed. Those skilled in the art will appreciate that controllers 35 and 70 operate similarly to a class of circuits referred to as ramp pulse modulation (RPM) circuits in that the controller does not have a fixed frequency clock to control the period or duty cycle of the drive pulses and the controller uses a first threshold value to initiate a drive pulse and a second threshold value to terminate the drive pulse. However those skilled in the art will also appreciate that controllers 35 and 70 provide multi-phase operation that was not previously accomplished with RPM controllers. Configuring the controllers to select the channel with the lowest current for forming a drive signal assists in balancing the output currents to more closely to the same value. Configuring the controller to compensate the error signal with the average value of the output currents additionally assists in balancing the value of the output currents. Forming a separate timing signal for each channel also assists in controlling the output currents individually and forming the controller to adjusting the timing signal to start at an average value of the current for the corresponding channel further assists in balancing the values of the output currents.

While the subject matter of the descriptions are described with specific preferred embodiments and example embodiments, the foregoing drawings and descriptions thereof depict only typical and examples of embodiments of the subject matter and are not therefore to be considered to be limiting of its scope, it is evident that many alternatives and variations will be apparent to those skilled in the art. For example the timing signals R1 through RN are described in one embodiment to be a ramp signal, but the timing signals may have other waveshapes in other embodiments such as a non-linearly increasing waveshape or an exponential waveshape or other waveshapes. Additionally, although the set circuit is illustrated to form the reference signal REF by adding the value of reference 76 to reference 73, a separate reference that has a value approximately equal to the value of the voltage from reference 73 plus the voltage from reference 76 may be used. Additionally, the value of the reference signal REF may be modulated by the average value of the output currents instead of modulating the value of ES to obtain CES. Although reference 73 is illustrated as forming a fixed signal, such as a fixed voltage value, reference 73 may have other embodiments. For example, reference 73 may be a variable reference signal such as adjusting the value of the reference signal responsively to a changing voltage requirement such as receives a voltage requirement signals from a microprocessor and using a digital to analog converter to form the value of the reference signal from reference 73.

As the claims hereinafter reflect, inventive aspects may lie in less than all features of a single foregoing disclosed embodiment. Thus, the hereinafter expressed claims are hereby expressly incorporated into this Detailed Description of the Drawings, with each claim standing on its own as a separate embodiment of an invention. Furthermore, while some embodiments described herein include some but not other features included in other embodiments, combinations of features of different embodiments are meant to be within the scope of the invention, and form different embodiments, as would be understood by those skilled in the art.

The invention claimed is:

1. A multi-phase power supply controller comprising:
- a first channel configured to form a first drive signal to control a first output current through a first inductor to control a value of an output voltage to a desired value;
- a second channel configured to form a second drive signal to control a second output current through a second inductor to control the value of the output voltage to the desired value;
- a first timing circuit of the first channel configured to form a first timing signal responsively to the first drive signal wherein the first timing signal is proportional to the first output current;
- a second timing circuit of the second channel configured to form a second timing signal responsively to the second drive signal wherein the second timing signal is proportional to the second output current;
- a select circuit configured to determine one of the first or second output currents having a lowest value and select a corresponding channel;
- a set circuit configured to form an error signal representative of a deviation of the output voltage from a desired threshold value and to responsively initiate the one of the first or second channel selected by the select circuit to form the respective first or second drive signal;
- a first reset circuit configured to terminate the first drive signal responsively to the first timing signal and the output voltage being no less than the desired threshold value; and
- a second reset circuit configured to terminate the second drive signal responsively to the second timing signal and the output voltage being no less than the desired threshold value.

2. The multi-phase power supply controller of claim 1 wherein the first timing circuit is configured to for a first ramp signal that is proportional to the first output current and to an input voltage and the second timing circuit is configured to form a second ramp signal that is proportional to the second output current and to the input voltage and wherein the output voltage is derived from the input voltage.

3. The multi-phase power supply controller of claim 1 wherein the select circuit is configured to receive the first and second timing signals and to select the corresponding channel responsively to the first or second reset circuits terminating either of the first or second drive signals.

4. The multi-phase power supply controller of claim 1 further including the set circuit configured to form an error signal that is representative of a difference between the output voltage and the desired value of the output voltage and to compensate the error signal by an average value of the first and second output currents combined to form the desired threshold value.

5. The multi-phase power supply controller of claim 4 further including an error amplifier configured to form the error signal and an averaging circuit configured to compensate she error signal by the average value of the first and second output currents combined.

6. The multi-phase power supply controller of claim 1 further including a transient circuit configured to initiate forming one or more of the first and second drive signals responsively to the output voltage decreasing to a low threshold value that is less than the desired threshold value.

7. The multi-phase power supply controller of claim 1 wherein the select circuit includes a compare circuit configured to compare the first and second timing signals to determine the lowest value.

8. A method of forming a power supply controller comprising:
- configuring the power supply controller with a plurality of channels wherein each channel is configured to form a drive signal to control an output current of a corresponding channel through an inductor of the corresponding channel to regulate a value of an output voltage to a range of values around a desired value;
- forming a select circuit of the power supply controller to select a first channel of the plurality of channels;
- configuring a set circuit to cause de first channel to form a first drive signal of the first channel responsively to the output voltage being less than a first threshold value; and
- forming a reset circuit for each channel of the plurality of channels wherein each reset circuit forms a reset signal to reset the drive signal of the corresponding channel responsively to the output voltage being no less than a second threshold value.

9. The method of claim 8 wherein forming the reset circuit includes forming the reset circuit to modulate the second threshold value responsively to the output current of the corresponding channel.

10. The method of claim 8 further including forming a timing circuit for each channel including configuring the timing circuit to form a timing signal having a value that is representative of the output current of the corresponding channel wherein the timing circuit initiates forming the timing signal responsively to the drive signal for the corresponding channel.

11. The method of claim 10 wherein forming the reset circuit includes forming the reset circuit to modulate the second threshold value of each reset circuit responsively to the output current of the corresponding channel.

12. The method of claim 10 wherein forming the timing circuit includes forming the timing circuit to generate a ramp signal by charging a capacitor responsively to asserting the drive signal of the corresponding channel and to charge the capacitor to an average value of the output current of the corresponding channel responsively to negating the drive signal of the corresponding channel.

13. The method of claim 8 wherein configuring the set circuit to cause the first channel to form the first drive signal includes configuring the set circuit to form a compensated error signal that is representative of a difference between the output voltage and the desired value of the output voltage and configuring the set circuit to enable the first channel as selected by the select circuit to form the first drive signal.

14. The method of claim 8 wherein forming the select circuit includes forming the select circuit to receive signals that are representative of the output current of each channel and determine the first channel of the plurality of channels that has a lowest value of output current and select the first channel.

15. A method of forming a power supply controller comprising:
- configuring the power supply controller to form a plurality of drive signals to control a plurality of output currents through a plurality of inductors to regulate a value of an output voltage between a first threshold value and a second threshold value;
- forming a select circuit of the power supply controller to select a first channel of the power supply controller that has a lowest value of output current;
- configuring a set circuit to initiate the first channel forming a first drive signal of the plurality of drive signals responsively to the output voltage having a first value that is less than the first threshold value; and
- forming a reset circuit for each drive signal wherein each reset circuit is configured to reset a corresponding drive signal responsively to the output voltage having a second value that is no less than the second threshold value and responsively to the corresponding drive signal including forming the second threshold value greater than the first threshold value and greater than a desired value.

16. The method of claim 15 wherein forming the set circuit includes forming the set circuit to assert an enable signal responsively to the output voltage having the first value that is less than the first threshold value and to enable the first channel as selected by the select circuit to assert the first drive signal.

17. The method of claim 16 wherein forming the set circuit to assert the enable signal includes configuring the set circuit to form an error signal that is representative of a difference between the output voltage and the desired value of the output voltage and to compensate the error signal by an average value of all output currents to form the desired threshold value and use the error signal as compensated to determine if the output voltage is less than the desired threshold value.

18. The method of claim 15 further including forming a timing circuit for each channel wherein each timing circuit is configured to form a timing signal that is representative of a value of the output current of the corresponding channel.

19. The method of claim 18 wherein forming the timing circuit for each channel includes forming at least one timing circuit to form a value of the timing signal during an off-time of the corresponding drive signal to be representative of an average value of output current for the corresponding channel.

20. The method of claim 15 wherein configuring the set circuit to initiate the first channel forming the first drive signal includes configuring an error amplifier to form an error signal that is representative of a difference between the output voltage and the desired value of the output voltage and initiate forming a drive signal of a channel selected by the select circuit responsively to the error signal having a value greater than a reference signal that is representative of the first threshold value.

* * * * *